(12) United States Patent
Chung et al.

(10) Patent No.: US 7,057,842 B2
(45) Date of Patent: Jun. 6, 2006

(54) METHOD, MEDIUM, AND APPARATUS FOR OFFLINE SELF SERVO WRITING AND DISK DRIVE USING THE SAME

(75) Inventors: Da-woon Chung, Suwon-si (KR); Kwang-jo Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/984,746

(22) Filed: Nov. 10, 2004

(65) Prior Publication Data
US 2005/0099720 A1    May 12, 2005

(30) Foreign Application Priority Data
Nov. 10, 2003   (KR) .................... 10-2003-0079171

(51) Int. Cl.
*G11B 21/02*   (2006.01)
(52) U.S. Cl. ...................................... 360/75
(58) Field of Classification Search ................. 360/75, 360/77.05, 78.11, 17
See application file for complete search history.

(56) References Cited

U.S. PATENT DOCUMENTS

| | | | |
|---|---|---|---|
| 5,012,363 A * | 4/1991 | Mine et al. ............ 360/77.05 |
| 6,049,440 A | 4/2000 | Shu | |
| 6,304,407 B1 * | 10/2001 | Baker et al. .................. 360/75 |
| 6,411,459 B1 | 6/2002 | Belser et al. | |
| 6,519,107 B1 | 2/2003 | Ehrlich et al. | |
| 6,683,744 B1 * | 1/2004 | Takano et al. ........... 360/78.11 |
| 6,704,156 B1 * | 3/2004 | Baker et al. .................. 360/75 |
| 6,738,205 B1 * | 5/2004 | Moran et al. ................. 360/17 |
| 6,943,977 B1 * | 9/2005 | Yatsu ........................... 360/75 |

* cited by examiner

*Primary Examiner*—William Klimowicz
*Assistant Examiner*—Fred F. Tzeng
(74) *Attorney, Agent, or Firm*—Staas & Halsey LLP

(57) ABSTRACT

An offline self servo writing method capable of improving servo writing accuracy and reducing copying time by designing a servo pattern of a reference disk to have the same resolution as a final servo pattern, and a disk drive using the method. The offline self servo writing method includes a servo information writing process performed after a reference disk, where a reference servo pattern having the same resolution as a final servo pattern, is written and one or more blank disks are assembled in the disk drive, wherein the servo information writing process is performed by simultaneously writing identical final servo information on all disks including the reference disk by using the reference servo pattern while following tracks of the reference disk.

23 Claims, 6 Drawing Sheets

METHOD, MEDIUM, AND APPARATUS FOR OFFLINE SELF SERVO WRITING AND DISK DRIVE USING THE SAME

CROSS-REFERENCE TO RELATED APPLICATIONS

This application claims the priority benefit of Korean Patent Application No. 2003-79171, filed on Nov. 10, 2003, in the Korean Intellectual Property Office, the disclosure of which is incorporated herein in its entirety by reference.

BACKGROUND OF THE INVENTION

1. Field of the Invention

The present invention relates to a servo writing in a disk drive, and more particularly, to a method, medium, and apparatus for offline self servo writing, and a disk drive using the method, capable of speedily and accurately writing servo information on a disk of the disk drive by using a reference disk assembled in an offline manner.

2. Description of the Related Art

A conventional method of writing servo information on a disk of a hard disk drive utilizes a highly accurate encoder and a mechanical pushpin. The mechanical pushpin is attached to a master actuator arm at one end and extends into the hard disk drive through a servo write slot at the other end. The master actuator arm is operated under a closed loop by using a positioner and the highly accurate encoder. In addition, a clock head is directed to write a clock track onto the disk to serve as a timing reference during a servo writing process. This servo writing process suffers from problems associated with non-repetitive run-out (NRRO), disk flutter, and motor rocking, all of which cause degradation of accuracy of position information written during the servo writing process. Moreover, the use of the positioner and encoder greatly increases expenses associated with the servo writing process and reduces productivity.

In order to solve these problems, an offline servo writing method and a self servo writing method have been developed.

In the offline servo writing method, each disk is servowritten by using an offline servo track writer before being installed into a hard disk drive assembly. While this method has the benefit of increased accuracy, it also has problems of increased repeatable run-out (RRO), due to shifting of a center of a disk, and a strict requirement for an additional track checking process at the time of head conversion.

On the other hand, a self servo writing method is a method of writing servo information by tracing pre-written reference servo information. In this method, the quality of written servo information is dependent on the accuracy of the reference servo information. The self servo writing method has the advantage of being inexpensive in implementation because of not having to greatly depend on a servo writer. However, it also suffers from the disadvantage of increased self servo writing time and deteriorated capability in following the reference servo information.

In order to solve these problems, a new servo writing method has been disclosed in U.S. Pat. No. 6,411,459. In this method, a reference disk and several blank disks are assembled in a disk drive, and servo information is then written on the blank disks by using the reference disk.

However, as shown in FIG. 1, in this conventional method, a track width in a servo pattern of the reference disk is larger than that in a final servo pattern of a copied disk. If there are irreparable defects in some portion of the reference servo pattern of the reference disk, the defects actually affect several tracks in the copied disk. For example, when three servo tracks are copied from a single servo track of the reference disk, an error in a single burst signal of the servo pattern of the reference disk will prevent copying of the three servo tracks. In addition, the required time for copying servo information increases and stability of servo pattern tracing becomes deteriorated.

SUMMARY OF THE INVENTION

The present invention provides an offline self servo writing method capable of improving servo writing accuracy and reducing copying time by designing a servo pattern of a reference disk to have the same resolution as a final servo pattern, and a disk drive using the method.

Additional aspects and/or advantages of the invention will be set forth in part in the description which follows and, in part, will be obvious from the description, or may be learned by practice of the invention.

To achieve the above and/or other aspects and advantages, embodiments of the present invention set forth an offline self servo writing method, including writing servo information for at least one blank disk and a reference disk based on a reference servo pattern, from the reference disk, with the reference disk having a resolution equal to a final servo pattern for the one blank disk, by simultaneously writing identical final servo information on the one disk and the reference disk and by using the reference servo pattern while following tracks of the reference disk.

The final servo pattern of the final servo information may have the same structure as the reference servo pattern read from the reference disk except for servo address/index mark signals, and wherein the servo address/index mark signals of the final servo pattern are based on different specifications from the reference servo pattern. Servo address/index mark signals of the reference servo pattern and the final servo pattern may be based on different specifications.

In addition, the method may further include a process of erasing the reference servo pattern written in the reference disk after the final servo information is written.

The method may further include compensating for position error signals created during a reference servo track following process by using a repeatable run-out correction compensation algorithm.

To achieve the above and/or other aspects and advantages, embodiments of the present invention set forth an offline self servo writing method, including manufacturing a reference disk having a reference servo pattern with a resolution equal to a final servo pattern, assembling one or more blank disks and the reference disk into a head disk assembly, reading reference servo pattern while following tracks of the reference disk, changing only servo address/index mark signals from the read reference servo pattern in accordance with a predetermined specification to generate the final servo pattern, and simultaneously writing the final servo pattern on the one or more blank disks and the reference disk.

To achieve the above and/or other aspects and advantages, embodiments of the present invention set forth a disk drive, including a head disk assembly comprising a reference disk having a reference servo pattern, with a resolution equal to a final pattern for one or more blank disks of the disk drive, a host interface transmitting/receiving data to/from a host system, a memory storing a firmware application used to control the disk drive, and information on servo address/index signal specifications for the reference servo pattern and the final servo patterns, a buffer storing read reference servo information, read from the reference disk in a self servo writing mode, a controller, when a self servo writing command is received from the host system, controlling a following of tracks of the reference disk, a sequentially reproducing of the reference servo pattern, a storing of the reproduced servo pattern in the buffer, a generating of the final servo pattern information by converting only servo address/index mark signals read from the reference servo pattern stored in the buffer in accordance with servo address/index signal specifications of the final servo pattern stored in the memory, and a simultaneously writing of the final servo pattern information on the reference disk and all of the blank disks assembled in the head disk assembly, and a write/read circuit writing the final servo pattern information on the blank disks, reading the reference servo pattern information from the reference disk, and storing read information in the buffer.

The controller may further include a control unit compensating for position error signals created during a reference servo track tracing process by using a repeatable run-out correction compensation algorithm. The controller may also include a control unit erasing the reference servo pattern on the reference disk after the final servo information is written on the reference disk.

To achieve the above and/or other aspects and advantages, embodiments of the present invention set forth a disk writing method, including generating servo information for at least one blank disk and a reference disk, based on a reference servo pattern written on the reference disk, with the reference disk having a resolution equal to a final servo pattern for the one blank disk, and writing final servo information on the one disk.

To achieve the above and/or other aspects and advantages, embodiments of the present invention set forth a disk drive, including at least one blank disk, a reference disk having a reference servo pattern, with a resolution equal to a final servo pattern for the at least one blank disk, a controller controlling tracks of the reference disk to be followed, generating final servo pattern information based on the followed reference disk tracks, and writing the final servo pattern information on the at least one blank disk.

The disk drive may further include a memory storing a firmware application used to control the disk drive, and information on servo address/index signal specifications for the reference servo pattern and the final servo patterns.

In addition, the controller may control a sequentially reproducing of the reference servo pattern, a storing of the reproduced servo pattern in a buffer, the generating of the final servo pattern information by converting only servo address/index mark signals read from the reference servo pattern stored in the buffer in accordance with servo address/index signal specifications of the final servo pattern stored in the memory, and simultaneously writing of the final servo pattern information on the reference disk and the at least one blank disk.

The controller may further include a control unit erasing the reference servo pattern on the reference disk after the final servo information is written on the reference disk, and/or a control unit compensating for position error signals created during reference servo track tracing, by using a repeatable run-out correction compensation algorithm.

To achieve the above and/or other aspects and advantages, embodiments of the present invention set forth a disk drive, including a plurality of disks, with one of the plurality of disks having been a reference disk having a reference servo pattern, with a resolution equal to a final servo pattern for the at least one blank disk, and another of the plurality of disks having servo pattern information written by a following of tracks of the reference disk, a generating of final servo pattern information based on the followed reference disk tracks, and a writing the final servo pattern information on the at least one blank disk, and a head to read/write data from/to at least one of the plurality of disks.

The disk drive may include a memory storing a firmware application used to control the disk drive, and information on servo address/index signal specifications for the reference servo pattern and the final servo patterns.

The final servo pattern information may be based on a converting of only servo address/index mark signals read from the reference servo pattern of the reference disk, in accordance with servo address/index signal specifications of the final servo pattern, and a simultaneously writing of the final servo pattern information to the reference disk and the other disk.

The reference disk may include the reference servo pattern, as erased, having been erased after the final servo information is written on the reference disk.

To achieve the above and/or other aspects and advantages, embodiments of the present invention set forth media including computer readable code to control a disk drive to perform methods of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
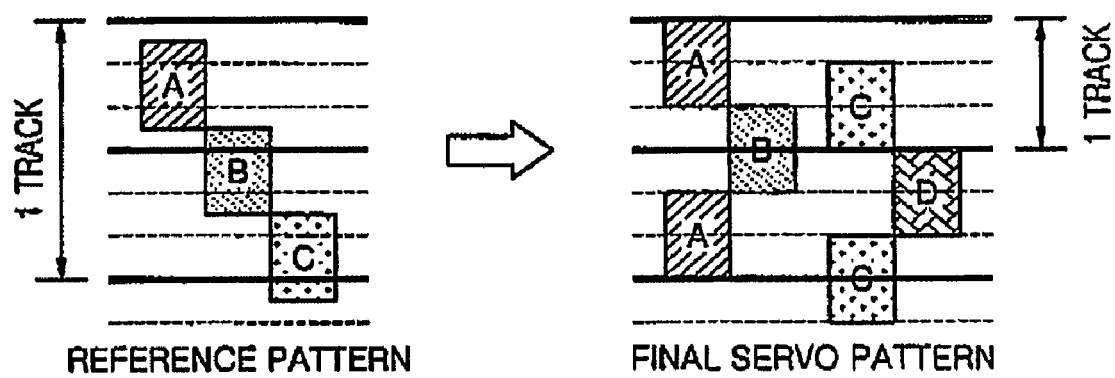
FIG. 1 illustrates a conventional reference servo pattern and a conventional final servo pattern.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 3:
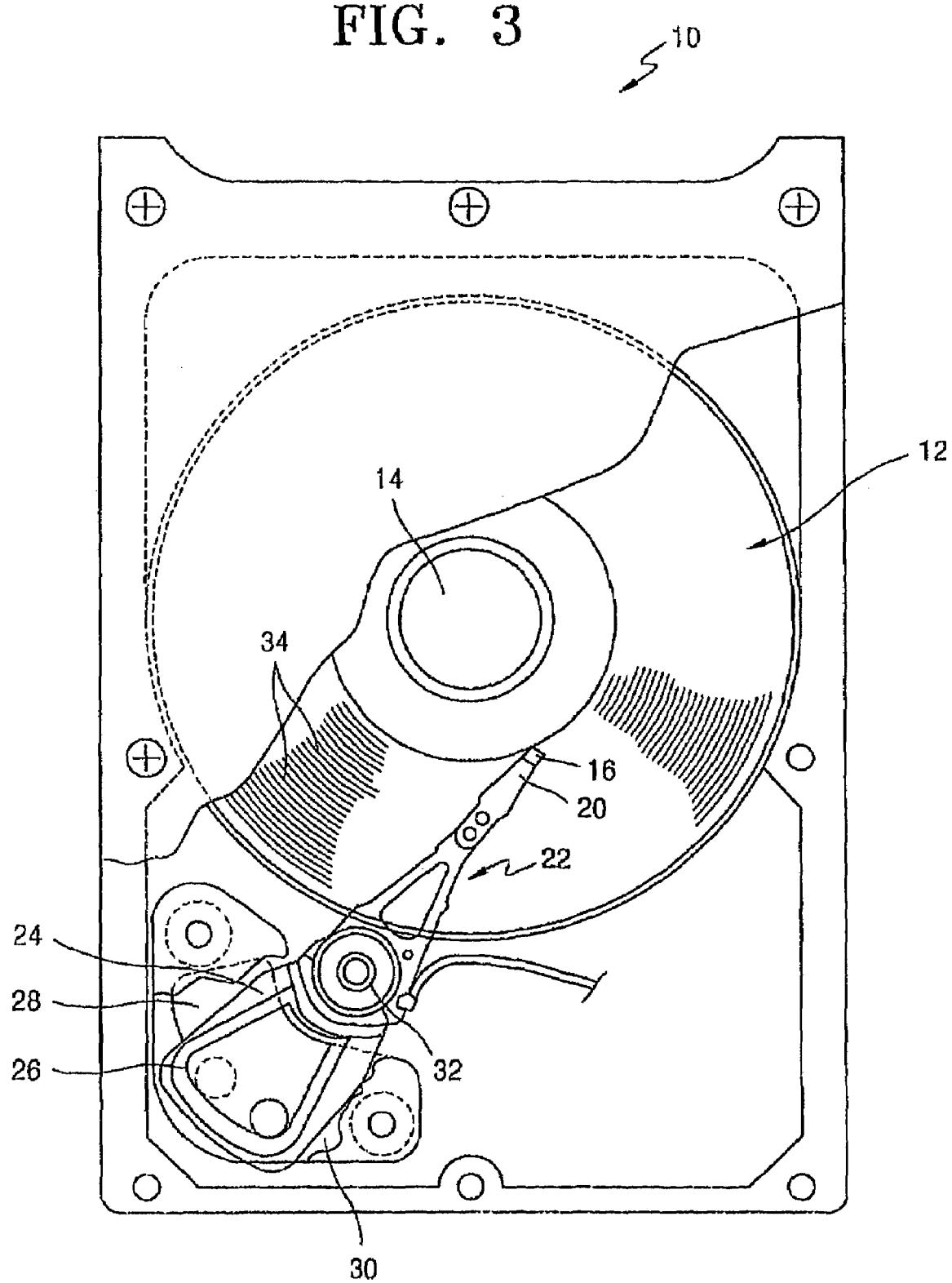
FIG. 3 illustrates a head disk assembly of a disk drive, according to an embodiment of the present invention.

A hard disk drive may include a head disk assembly and circuitry. Accordingly, FIG. 3 illustrates a head disk assembly 10 of a hard disk drive, according to an embodiment of the present invention. The head disk assembly 10 includes at least one magnetic disk 12 rotated by a spindle motor 14. The head disk assembly 10 further includes a transducer (not shown) disposed adjacent to the surfaces of magnetic disk 12.

The transducer reads/writes information from/to the disk 12 by sensing magnetic fields of the disk 12 and magnetizing the disk 12. Typically, the transducer is positioned with respect to each of the disk surfaces. Although a single transducer is described, it should be understood that the transducer may include a read transducer for sensing the magnetic fields of the disk 12 and a write transducer for magnetizing the disk 12. The read transducer is made of a magneto-resistive (MR) material.

The transducer may be integrated into a head 16. An air bearing is typically formed between the transducer and the disk surface by the motion of the head 16 on the disk surface. The head 16 is incorporated into a head stack assembly 22. The head stack assembly 22 is attached to an actuator arm 24 having a voice coil 26. The voice coil 26 is located adjacent to a magnetic assembly 28 to define a voice coil motor 30. When a current is supplied to the voice coil 26, the voice coil motor 30 generates a torque rotating the actuator arm 24 about a bearing assembly 32. Rotation of the actuator arm 24 will move the transducer across the disk surface.

Typically, information is stored in annular tracks 34 on the disk 12. Each of the tracks 34 has a plurality of sectors. Each of the sectors has data fields and identification fields. The identification fields include a grey code used to identify a sector and a track (cylinder). The transducer moves across the disk surface in order to read or write information recorded in other tracks 34.

Figure 5:
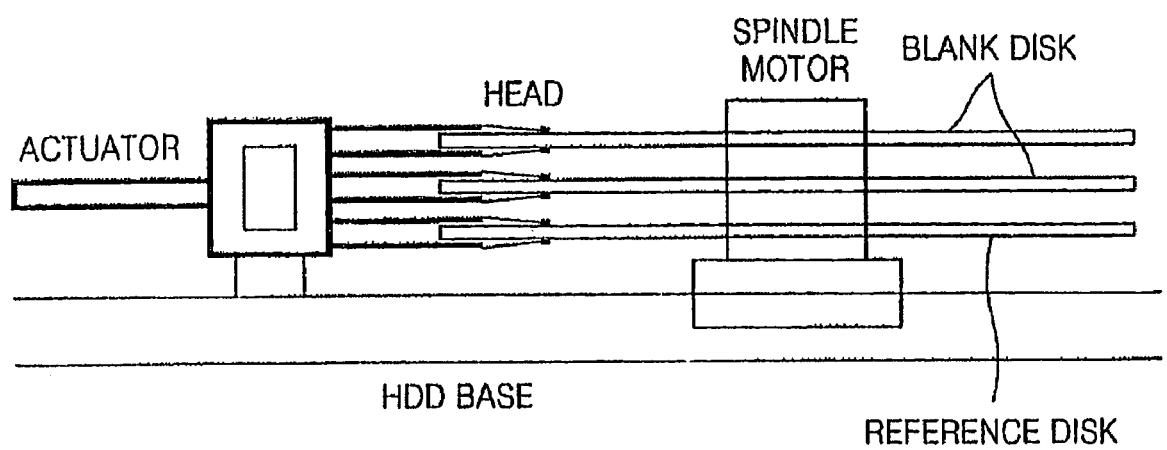
FIG. 5 illustrates a reference disk and blank disks assembled in a head disk assembly.

In the offline self writing method, according to embodiments of the present invention, at least a single reference disk and one or more blank disks are assembled in the head disk assembly 10, as illustrated in FIG. 5. In FIG. 5, only two blank disks are shown, for the sake of convenience.

Figure 4:
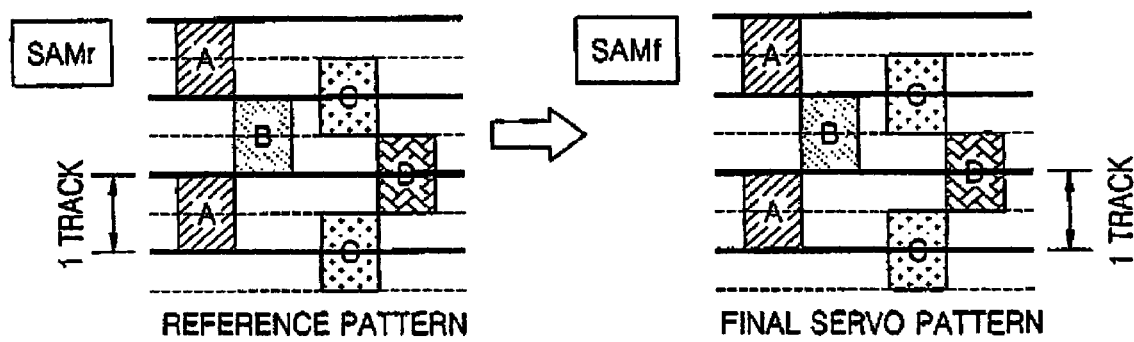
FIG. 4 illustrates a reference servo pattern and a final servo pattern, according to an embodiment of the present invention.

FIG. 4 illustrates a reference servo pattern and a final servo pattern, according to an embodiment of the present invention. The reference servo pattern is designed to have the same resolution as the final servo pattern.

Figure 2:
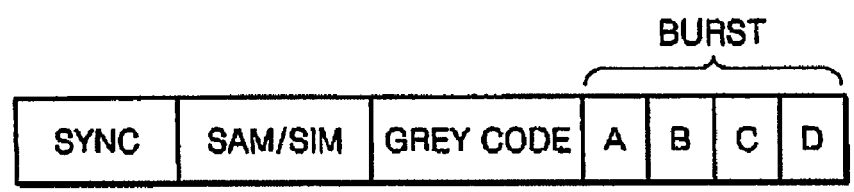
FIG. 2 illustrates a structure of a conventional servo pattern written on a disk of a disk drive.

The final servo pattern recorded on the disk 12 of the hard disk drive includes a servo synchronization signal SYNC, servo address/index mark signals SAM/SIM, a grey code, and bursts A, B, C, and D, as illustrated in FIG. 2. The reference servo pattern has the same structure as the final servo pattern except for the servo address/index mark signals SAM/SIM.

Figure 6:
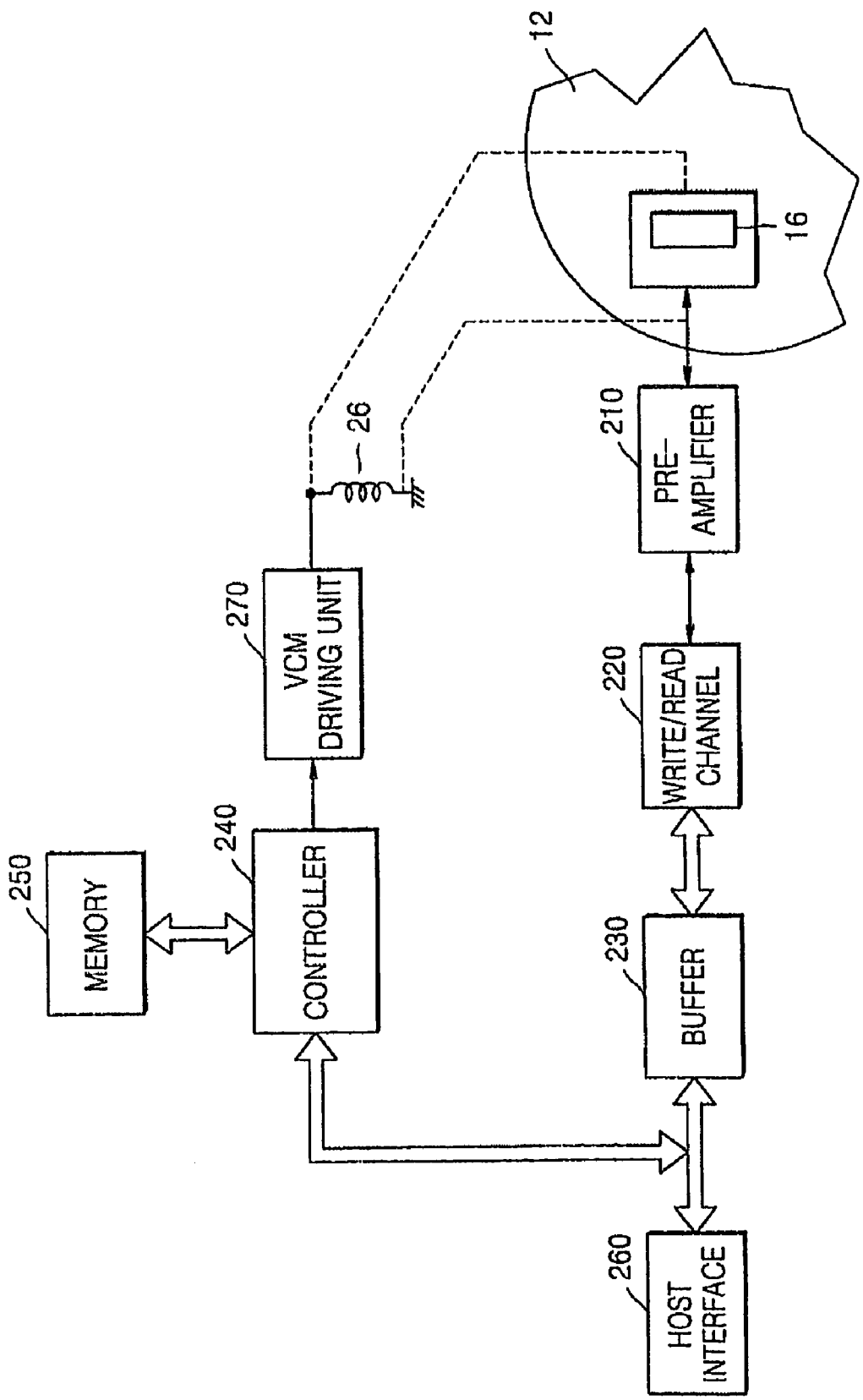
FIG. 6 is a circuit diagram of a disk drive using an offline self servo writing method, according to an embodiment of the present invention.

FIG. 6 is a circuit diagram of a disk drive where an offline self servo writing method is implemented, according to an embodiment of the present invention.

As shown in FIG. 6, the disk drive includes multiple disks 12, a transducer 16, a pre-amplifier 210, a write/read channel 220, a buffer 230, a controller 240, a memory 250, a host interface 260, and a VCM driving unit 270.

The pre-amplifier 210 and the write/read channel 220 are collectively referred to as a write/read circuit.

A firmware program and information on servo address/index signal specifications of the reference and final servo patterns are stored in the memory 250. The memory 250 may be a flash memory, that is, a non-volatile memory.

Now, operations of the disk drive will be described.

In a read mode of the disk drive, the transducer 16, sometimes referred as a head, senses an electrical signal from the disk 12. An electrical signal is amplified with a signal process in the pre-amplifier 210. An amplified signal in an analog form is encoded into a digital signal by the write/read channel 220, so that the digital signal can be read by a host system (not shown). The digital signal is converted into a data stream. The data stream is temporarily stored in the buffer 230 and then transmitted to the host system through the host interface 260. In a self servo writing mode, the reference servo information read from the reference disk is sequentially stored in the buffer 230.

In a write mode of the disk drive, data is received from the host system through the host interface 260 and temporarily stored in the buffer 230. The data stored in the buffer 230 is sequentially output and converted into a binary data stream. The data is written on the disk 12 by the transducer 16 using a write current amplified by the pre-amplifier 210.

The controller 240 analyzes commands received from the host system through the host interface 260 and controls the disk drive based on analysis of the commands. When a self servo writing command is received from the host system, the transducer 16 follows tracks in the reference disk and reference servo patterns are sequentially reproduced. The reproduced servo patterns are stored in the buffer 230. The final servo pattern information is generated by converting only the servo address/index mark signals SAM/SIM out of the reference servo patterns stored in the buffer 230, in accordance with servo address/index mark (SAM/SIM) signal specifications of the final servo patterns stored in the memory 250. The final servo pattern information is simultaneously written on the reference disk and all the blank disks assembled in the head disk assembly (HDA).

Since the reference disk is assembled in an offline manner, a repeatable run-out (RRO) may appear. Therefore, position error signals occurring when following servo tracks are treated as errors of copied servo tracks.

In order to solve this problem, an RRO correction compensating (RCC) process is performed in the controller 240. In the RRO process, average values of position errors are obtained during several rotations of the reference disk, position errors of a next to-be-traced sector are estimated, and a head position is corrected.

Figure 7:
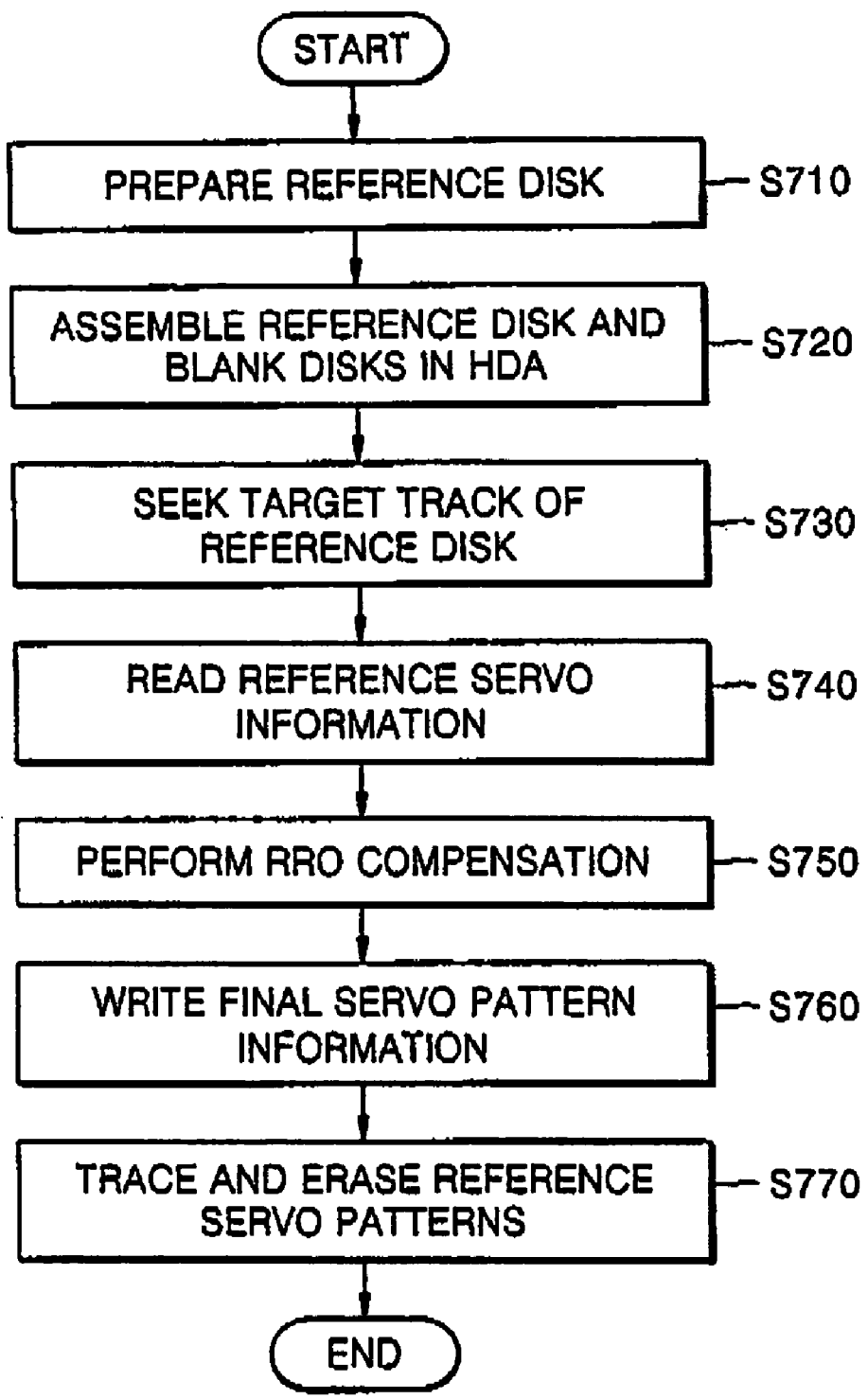
FIG. 7 is a flow chart illustrating an offline self writing method, according to an embodiment of the present invention.

Now, an offline servo writing method of the present invention will be described with reference to the flowchart of FIG. 7.

A reference disk is prepared (S710). As shown in FIG. 4, reference servo patterns are designed to have the same resolution as the final servo patterns. In addition, the reference servo patterns have the same structure as the final servo patterns, except for servo address/index mark signals SAM/SIM.

The reference disk, prepared in operation S710, and blank disks, that is, storage media used for a disk drive, are assembled in a head disk assembly (HDA) (S720).

A target track TRACK0 of the reference disk is sought (S730), and the reference servo information is read from the track of the reference disk (S740). An RRO correction compensation is performed (S750). In some cases, operation S750 may be omitted.

The final servo pattern information is generated by converting only the servo address/index mark signals SAM/SIM out of the reference servo patterns, in accordance with servo address/index signal specifications of the final servo patterns stored in a memory. The final servo pattern information is simultaneously written on the reference disk and all the blank disks assembled in the HDA (S760).

After the servo information writing operation S760, the reference servo patterns written in the reference disk are traced and erased (S770).

Since the reference servo patterns, having the same resolution as the final servo patterns, are used in embodiments of the present invention, the necessary time required for writing the reference servo patterns in the reference disk increases. However, since ten or more disks can be simultaneously written by using an offline servo writing apparatus, according to embodiments of the present invention, the required time needed for writing the servo patterns can be reduced.

In addition, since the reference servo patterns have the same resolution as the final servo patterns, in embodiments of the present invention, disturbances created during a final servo pattern copying process can be minimized. In comparison with the conventional method of using reference servo patterns having a lower resolution than the final servo patterns, implementations of embodiments of the present invention result in improved copying times for servo. In embodiments of the present invention, since the servo information is copied by using the reference servo patterns having the same resolution as the final servo patterns, stability of servo information copying can be improved and the required copying time for the servo information can be further reduced. In addition, when there are irreparable defects in portions of the reference servo patterns, influence of the defects on the copied servo pattern can be minimized.

Embodiments of the present invention may be implemented as a method, apparatus, system, etc. When implemented in software or computer readable code, elements of the present invention can essentially be code segments performing necessary tasks. The code segments, or a program, can be stored in a processor readable medium or transmitted as computer data signals coupled to a carrier wave through a communication medium or network. The processor readable medium includes any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, an optical fiber medium, an RF network, etc. Examples of the computer data signals include any signals that can be transmitted through a transmission medium such as an electronic network channel, an optical fiber, air, an electromagnetic network, and an RF network.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An offline self servo writing method, comprising writing servo information for at least one blank disk and a reference disk based on a reference servo pattern, from the reference disk, with the reference disk having a resolution equal to a final servo pattern for the one blank disk, by simultaneously writing identical final servo information on the one blank disk and the reference disk and by using the reference servo pattern while following tracks of the reference disk,
wherein the final servo pattern of the final servo information has the same structure as the reference servo pattern read from the reference disk except for servo address/index mark signals, and wherein the servo address/index mark signals of the final servo pattern are based on different specifications than the reference servo pattern.

2. The offline self servo writing method according to claim 1, wherein the method further comprises erasing the reference servo pattern written in the reference disk after the final servo information is written.

3. The offline self servo writing method according to claim 3, wherein servo address/index mark signals of the reference servo pattern and the final servo pattern are based on different specifications.

4. The offline self servo writing method according to claim 1, wherein the method further comprises a process of compensating for position error signals created during a reference servo track following process by using a repeatable run-out correction compensation algorithm.

5. A medium comprising computer readable code to control a disk drive to perform the method of claim 1.

6. An offline self servo writing method, comprising:
manufacturing a reference disk having a reference servo pattern with a resolution equal to a final servo pattern;
assembling at least one blank disk and the reference disk into a head disk assembly;
reading reference servo pattern while following tracks of the reference disk;
changing only servo address/index mark signals from the read reference servo pattern in accordance with a predetermined specification to generate the final servo pattern; and
simultaneously writing the final servo pattern on the at least one blank disk and the reference disk.

7. The offline self servo writing method of claim 6, further comprising erasing the reference servo pattern on the reference disk after the final servo information is written on the reference disk.

8. The offline self servo writing method of claim 6, further comprising compensating for position error signals created during a reference servo track following process by using a repeatable run-out correction compensation algorithm.

9. A medium comprising computer readable code to control a disk drive to perform the method of claim 6.

10. A disk drive comprising:
a head disk assembly comprising a reference disk having a reference servo pattern, with a resolution equal to a final pattern for at least one blank disk of the disk drive;
a host interface transmitting/receiving data to/from a host system;
a memory storing a firmware application used to control the disk drive, and information on servo address/index signal specifications for the reference servo pattern and the final servo patterns;
a buffer storing read reference servo information, read from the reference disk in a self servo writing mode;
a controller, when a self servo writing command is received from the host system, controlling a following of tracks of the reference disk, a sequentially reproducing of the reference servo pattern, a storing of the reproduced servo pattern in the buffer, a generating of the final servo pattern information by converting only servo address/index mark signals read from the reference servo pattern stored in the buffer in accordance with servo address/index signal specifications of the final servo pattern stored in the memory, and a simultaneously writing of the final servo pattern information on the reference disk and the at least one blank disk assembled in the head disk assembly; and
a write/read circuit writing the final servo pattern information on the one blank disk, reading the reference servo pattern information from the reference disk, and storing read information in the buffer.

11. The disk drive of claim 10, wherein the controller further comprises a control unit erasing the reference servo pattern on the reference disk after the final servo information is written on the reference disk.

12. The disk drive according to claim 10, wherein the controller further comprises a control unit compensating for position error signals created during a reference servo track tracing process by using a repeatable run-out correction compensation algorithm.

13. A disk writing method, comprising:
generating servo information for at least one blank disk and a reference disk, based on a reference servo pattern written on the reference disk, with the reference disk having a resolution equal to a final servo pattern for the one blank disk; and
writing final servo information on the one blank disk,
wherein the final servo pattern of the final servo information has a structure equal to the reference servo pattern read from the reference disk except for servo address/index mark signals, and wherein the servo address/index mark signals of the final servo pattern are based on different specifications than the reference servo pattern.

14. The disk writing method of claim 13, wherein the writing of the final servo information to the one disk includes simultaneously writing the final servo information to the reference disk.

15. The disk writing method of claim 14, further comprising erasing the reference servo pattern on the reference disk after the final servo information is written.

16. The disk writing method of claim 15, wherein servo address/index mark signals of the reference servo pattern and the final servo pattern are based on different specifications.

17. The disk writing method of claim 13, further comprising compensating for position error signals created during a reference servo track following, by using a repeatable run-out correction compensation algorithm.

18. A disk drive comprising:
at least one blank disk;
a reference disk having a reference servo pattern, with a resolution equal to a final servo pattern for the at least one blank disk;
a controller controlling tracks of the reference disk to be followed, generating final servo pattern information based on the followed reference disk tracks, and writing the final servo pattern information on the at least one blank; and
a memory storing a firmware application used to control the disk drive, and information on servo address/index signal specifications for the reference servo pattern and the final servo patterns,
wherein the controller controls a sequentially reproducing of the reference servo pattern, a storing of the reproduced servo pattern in a buffer, the generating of the final servo pattern, information by converting only servo address/index mark signals read from the reference servo pattern stored in the buffer in accordance with servo address/index signal specifications of the final servo pattern stored in the memory, and simultaneously writing of the final servo pattern information on the reference disk and the at least one blank disk.

19. The disk drive of claim 18, wherein the controller further comprises a control unit erasing the reference servo pattern on the reference disk after the final servo information is written on the reference disk.

20. The disk drive of claim 18, wherein the controller further comprises a control unit compensating for position error signals created during reference servo track tracing, by using a repeatable run-out correction compensation algorithm.

21. A disk drive comprising:
a plurality of disks, with one of the plurality of disks having been a reference disk having a reference servo pattern, with a resolution equal to a final servo pattern for at least one blank disk, of the plurality of disks, with the at least one blank disk having servo pattern information written to by a following of tracks of the reference disk, a generating of final servo pattern information based on the followed reference disk tracks, and a writing the final servo pattern information on the at least one blank disk; and
a head to read/write data from/to at least one of the plurality of disks,
wherein the final servo pattern information is based on a converting of only servo address/index mark signals read from the reference servo pattern of the reference disk, in accordance with servo address/index signal specifications of the final servo pattern, and a simultaneously writing of the final servo pattern information to the reference disk and the at least one blank disk.

22. The disk drive of claim 21, further comprising a memory storing a firmware application used to control the disk drive, and information on servo address/index signal specifications for the reference servo pattern and the final servo patterns.

23. The disk drive of claim 21, wherein the reference disk comprises the reference servo pattern, as erased, having been erased after the final servo information is written on the reference disk.

* * * * *

UNITED STATES PATENT AND TRADEMARK OFFICE
CERTIFICATE OF CORRECTION

| | | |
|---|---|---|
| PATENT NO. | : 7,057,842 B2 | Page 1 of 1 |
| APPLICATION NO. | : 10/984746 | |
| DATED | : June 6, 2006 | |
| INVENTOR(S) | : Da-woon Chung et al. | |

It is certified that error appears in the above-identified patent and that said Letters Patent is hereby corrected as shown below:

Column 8, Line 2, change "claim 3," to --claim 2,--.

Column 9, Line 44, change "blank;" to --blank disk;--.

Column 10, Line 2, change "pattern," to --pattern--.

Signed and Sealed this

Fourteenth Day of November, 2006

JON W. DUDAS
*Director of the United States Patent and Trademark Office*